UNITED STATES PATENT OFFICE.

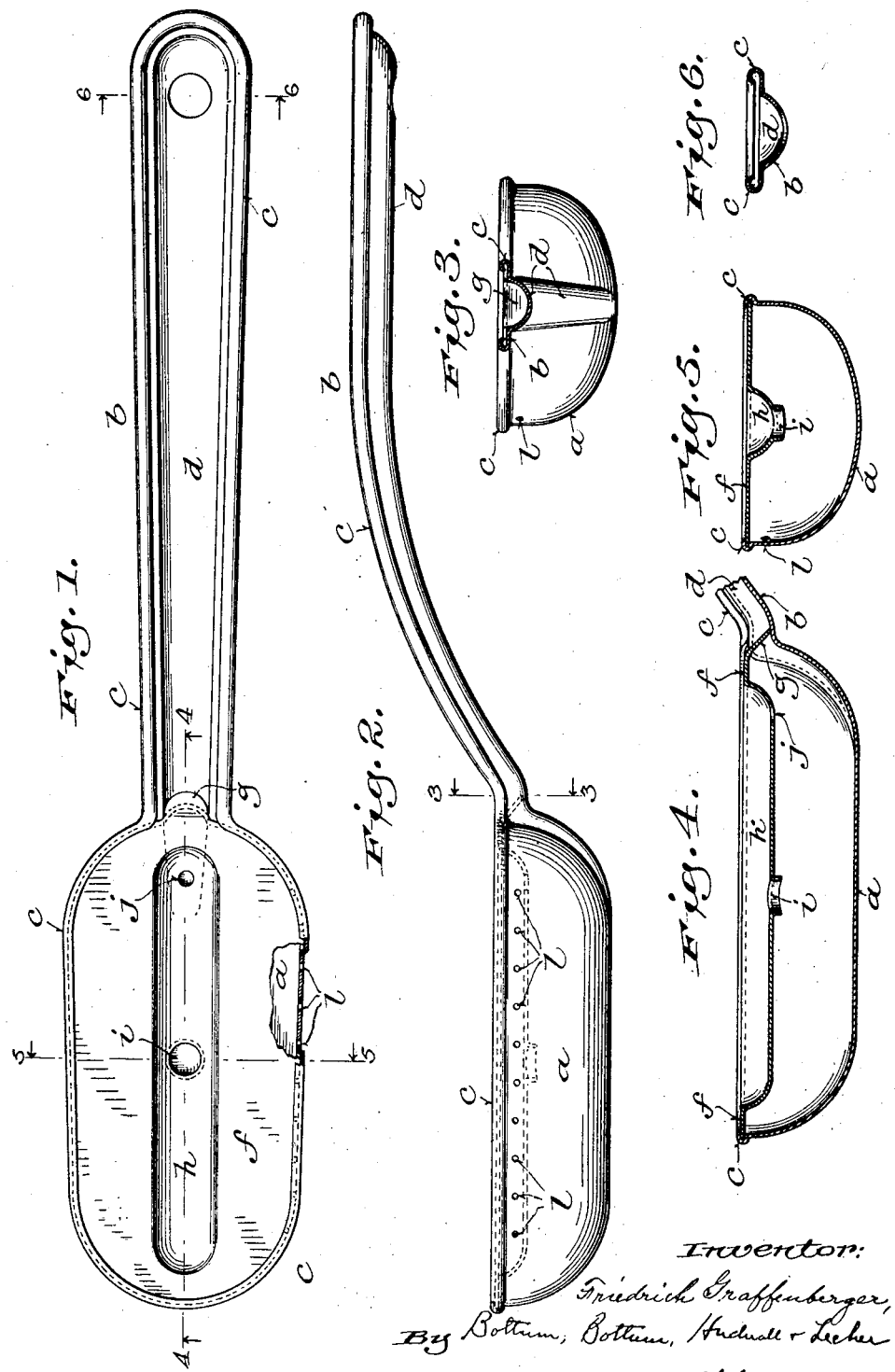

FRIEDRICH GRAFFENBERGER, OF MILWAUKEE, WISCONSIN.

SPRINKLING-SPOON.

1,347,902.  Specification of Letters Patent.  Patented July 27, 1920.

Application filed November 8, 1919. Serial No. 336,762.

*To all whom it may concern:*

Be it known that I, FRIEDRICH GRAFFENBERGER, a citizen of the United States, residing at Milwaukee, in the county of Milwaukee and State of Wisconsin, have invented certain new and useful Improvements in Sprinkling-Spoons, of which the following is a specification, reference being had to the accompanying drawing, forming a part thereof.

The main objects of this invention are to facilitate evenly sprinkling clothes or other things with water or other liquid, and generally to improve the construction and operation of devices of this class.

It consists in the construction, arrangement and combination of parts as hereinafter particularly described and pointed out in the claims.

In the accompanying drawing like characters designate the same parts in the several figures.

Figure 1 is a plan view of a spoon embodying the invention; Fig. 2 is a side elevation thereof; Fig. 3 is a cross section on the line 3—3, Fig. 2, showing the bowl in end elevation; Fig. 4 is a longitudinal section of the bowl on the line 4—4, Fig. 1; Fig. 5 is a cross section of the bowl on the line 5—5, Fig. 1; and Fig. 6 is a cross section of the handle on the line 6—6, Fig. 1.

The spoon comprises a bowl $a$, and a handle $b$ preferably formed integrally with the bowl, which may be made of tin plate or light sheet metal of any suitable kind. The bowl and handle are formed with an upwardly and inwardly bent marginal bead $c$, which serves to impart strength and rigidity to the spoon, to fasten and hold the cover in place over the bowl, and to provide the handle with a smooth rounded edge easy to the hand, giving the spoon a finished appearance and admitting of the use of light sheet metal in its construction.

To further stiffen and strengthen the handle and its attachment to the bowl, it is formed with a longitudinal flute or channel $d$, which extends into the adjoining end of the bowl and reinforces it at the junction of the handle therewith.

A cover $f$, which like the rest of the spoon, may be made of tin plate or light sheet metal, is fitted and securely clasped in the marginal bead $c$ surrounding the bowl. At the end next to the handle the cover is formed with a downwardly bent ear $g$, which fits into and closes the channel $d$ between the bowl and handle. The cover is also formed with a longitudinal depression $h$, which not only stiffens and strengthens it, but also facilitates filling it, a downwardly flanged or extended filling opening $i$ being formed in the central lower part of the depression. A vent opening $j$, is formed in the depression adjacent one end, preferably the end nearest the handle, to permit the free escape of air from the spoon when the filling opening is submerged in water or other liquid.

The spoon is provided above the plane of the filling opening $i$, with a number of small jet apertures $l$, which may be formed in the bowl or cover and variously arranged. As shown by the drawing they are formed in one side of the bowl just below the bead $c$.

In the use and operation of the spoon, the bowl is filled by plunging it in an inclined position, into water or other liquid, to submerge the filling opening $i$ and leave the vent opening $j$ above the surface of the liquid in direct communication with the atmosphere. After it has been thus filled, which requires but a second or two, it is inverted or held edgewise and shaken, to discharge the water or other liquid therefrom through the jet apertures $l$, by which it is evenly distributed and sprinkled over the clothes or other objects to be moistened, the filling and vent openings $i$ and $j$ being held above the jet apertures.

Various modifications in the minor details of construction may be made, without departure from the principle and scope of the invention as defined in the following claims.

I claim:

1. A sprinkling spoon comprising a bowl provided with a handle and a cover having a filling opening into the bowl below the plane of the top of the bowl, the spoon having a number of small jet apertures above the plane of the filling opening when the bowl is held with the cover uppermost and below said opening when the bowl is held in an inverted position.

2. A sprinkling spoon comprising a bowl provided with a handle and a cover attached to the rim of the bowl and formed with a depressed portion having a filling opening in the lower part into the bowl below the plane of the cover, the spoon having a number of small jet apertures above the plane of the filling opening when the spoon is held cover uppermost.

3. A sprinkling spoon comprising a bowl and a cover, one of which is formed with small jet apertures, the cover being formed with a filling opening below the plane of the jet apertures and with a vent opening, and a handle attached to the bowl.

4. A sprinkling spoon comprising a bowl formed with an upwardly and inwardly bent marginal bead, and provided with a handle, and a cover fitted and clasped in the marginal bead of the bowl and formed with a filling opening below the top of the bowl, the spoon being provided above the plane of the filling opening with small jet apertures.

5. A sprinkling spoon comprising a bowl provided with a handle formed with a marginal bead extending continuously around the bowl and handle, and a cover clasped in the bead around the bowl and formed with a filling opening below the top of the bowl, the spoon being provided above the plane of the filling opening with small jet apertures.

6. A sprinkling spoon formed of sheet metal and comprising a bowl formed with an upwardly and inwardly bent marginal bead, a handle formed integrally with the bowl and having a longitudinal stiffening flute extending into the bowl, and a cover clasped in the bead around the bowl and formed with a filling opening, the spoon being provided above the plane of said opening with small jet apertures.

7. A sprinkling spoon comprising a bowl and handle formed with an upwardly and inwardly bent marginal bead extending continuously around them, the handle having a longitudinal flute extending into the adjoining part of the bowl, and a cover clasped in the bead around the bowl and formed with a longitudinal depression having a filling opening extended downwardly from the lower part of the depression.

In witness whereof I hereto affix my signature.

FRIEDRICH GRAFFENBERGER.